US012559654B2

(12) United States Patent
Tsuchibuchi et al.

(10) Patent No.: US 12,559,654 B2
(45) Date of Patent: Feb. 24, 2026

(54) HIGH-FREQUENCY DIELECTRIC HEATING ADHESIVE SHEET, JOINING METHOD, AND JOINED BODY

(71) Applicant: LINTEC CORPORATION, Tokyo (JP)

(72) Inventors: Koji Tsuchibuchi, Tokyo (JP); Naoki Taya, Tokyo (JP)

(73) Assignee: LINTEC Corporation, Tokyo (JP)

( * ) Notice: Subject to any disclaimer, the term of this patent is extended or adjusted under 35 U.S.C. 154(b) by 584 days.

(21) Appl. No.: 18/012,852

(22) PCT Filed: Jun. 25, 2021

(86) PCT No.: PCT/JP2021/024195
§ 371 (c)(1),
(2) Date: Dec. 23, 2022

(87) PCT Pub. No.: WO2022/004605
PCT Pub. Date: Jan. 6, 2022

(65) Prior Publication Data

US 2023/0257636 A1 Aug. 17, 2023

(30) Foreign Application Priority Data

Jun. 30, 2020 (JP) ................................ 2020-113539

(51) Int. Cl.

| | |
|---|---|
| ***C09J 123/12*** | (2006.01) |
| ***B32B 7/12*** | (2006.01) |
| ***B32B 17/10*** | (2006.01) |
| ***B32B 27/20*** | (2006.01) |
| ***B32B 27/32*** | (2006.01) |
| ***B32B 37/06*** | (2006.01) |
| ***B32B 37/12*** | (2006.01) |
| ***C08K 5/5415*** | (2006.01) |
| *C08K 3/22* | (2006.01) |

(52) U.S. Cl.
CPC ............... *C09J 123/12* (2013.01); *B32B 7/12* (2013.01); *B32B 17/10* (2013.01); *B32B 27/20* (2013.01); *B32B 27/32* (2013.01); *B32B 37/06* (2013.01); *B32B 37/1284* (2013.01); *C08K 5/5415* (2013.01); *B32B 2264/1022* (2020.08); *B32B 2264/1025* (2020.08); *B32B 2264/104* (2013.01); *B32B 2264/303* (2020.08); *B32B 2307/204* (2013.01); *B32B 2307/54* (2013.01); *B32B 2310/14* (2013.01); *B32B 2315/08* (2013.01); *C08K 2003/2296* (2013.01)

(58) Field of Classification Search
None
See application file for complete search history.

(56) References Cited

U.S. PATENT DOCUMENTS

2003/0109658 A1* 6/2003 Yoshihara .................. C09J 9/02
526/348
2019/0352546 A1* 11/2019 Taya .......................... C08J 7/18

FOREIGN PATENT DOCUMENTS

| | | | |
|---|---|---|---|
| CN | 110291166 | A | 9/2019 |
| JP | H03-137179 | A | 6/1991 |
| JP | 2004-107588 | A | 4/2004 |
| JP | 2013-104052 | A | 5/2013 |
| WO | 2005/086557 | A1 | 9/2005 |
| WO | 2018/147351 | A1 | 8/2018 |
| WO | 2018/147352 | A1 | 8/2018 |

OTHER PUBLICATIONS

English translation of the International Preliminary Report on Patentability issued in corresponding International Patent Application No. PCT/JP2021/024195, dated Dec. 13, 2022.
International Search Report issued in corresponding International Patent Application No. PCT/JP2021/024195, dated Aug. 31, 2021, with English translation.
First Notification of Examiner's Opinion issued in corresponding Chinese Patent Application No. 202180047061.1, dated Jan. 17, 2024.

* cited by examiner

*Primary Examiner* — Sheeba Ahmed
(74) *Attorney, Agent, or Firm* — Rimon P.C.

(57) ABSTRACT

A high-frequency dielectric heating adhesive sheet includes an adhesive layer. The adhesive layer contains a thermoplastic resin having a reactive site, a dielectric filler that generates heat upon application of a high-frequency electric field, and a silane coupling agent.

15 Claims, 2 Drawing Sheets

HIGH-FREQUENCY DIELECTRIC HEATING ADHESIVE SHEET, JOINING METHOD, AND JOINED BODY

CROSS REFERENCE TO RELATED APPLICATIONS

This patent application is the U.S. National Phase under 35 U.S.C. § 371 of International Application No. PCT/JP2021/024195, filed on Jun. 25, 2021, which claims the benefit of Japanese Patent Application No. 2020-113539, dated Jun. 30, 2020, the entire contents of each are hereby incorporated by reference in their entirety.

TECHNICAL FIELD

The present invention relates to a high-frequency dielectric heating adhesive sheet, a bonding method, and a joined body.

BACKGROUND ART

As a method of bonding adherends having difficulty in bonding, there has been recently proposed, for example, a method including performing a dielectric heating treatment, an induction heating treatment, a supersonic welding treatment, a laser welding treatment, or the like with an adhesive agent interposed between the adherends, the adhesive agent being made by mixing a heat-generating material into a predetermined resin.

A bonding method using glass as adherends is exemplified by techniques as described below.

For example, Patent Literature 1 describes a dielectric heating adhesive film for bonding a plurality of adherends made from the same or different materials. The dielectric heating adhesive film contains a polyolefin resin having a polar site and a dielectric filler blended at a predetermined ratio.

CITATION LIST

Patent Literature(s)

Patent Literature 1: WO2018/147352

SUMMARY OF THE INVENTION

Problem(s) to be Solved by the Invention

Patent Literature 1 also describes a glass material as an exemplary adherend. The dielectric heating adhesive film described in Patent Literature 1, however, is not likely to have sufficient bonding strength to the glass material.

An object of the invention is to provide a high-frequency dielectric heating adhesive sheet bondable, even with low consumption energy, to glass with high bonding strength, to provide a bonding method using the high-frequency dielectric heating adhesive sheet, and to provide a joined body obtained by bonding adherends made of glass with high bonding strength.

Means for Solving the Problem(s)

According to an aspect of the invention, there is provided a high-frequency dielectric heating adhesive sheet including an adhesive layer that contains: a thermoplastic resin (A) having a reactive site (Y); a dielectric material that generates heat upon application of a high-frequency electric field; and a silane coupling agent (C).

In the high-frequency dielectric heating adhesive sheet according to the aspect of the invention, a volume content ratio of the silane coupling agent (C) in the adhesive layer is preferably in a range from 0.5 vol % to 25 vol %.

In the high-frequency dielectric heating adhesive sheet according to the aspect of the invention, the silane coupling agent (C) preferably contains a functional group (X) and an alkoxysilyl group (Z), and a main chain linking the functional group (X) with a silicon atom of the alkoxysilyl group (Z) preferably has six or more atoms.

In the high-frequency dielectric heating adhesive sheet according to the aspect of the invention, a molecular weight of the silane coupling agent (C) is preferably 200 or more.

In the high-frequency dielectric heating adhesive sheet according to the aspect of the invention, the functional group (X) is preferably at least one group selected from the group consisting of an epoxy group, an amino group, an isocyanate group, and a mercapto group.

In the high-frequency dielectric heating adhesive sheet according to the aspect of the invention, a difference ΔT between a 5%-weight-reduction temperature Td5 of the silane coupling agent (C) and a flow start temperature Tfs of the thermoplastic resin (A), represented by a numerical formula (Numerical Formula 1), is preferably −20 degrees C. or more.

$$\Delta T = Td5 - Tfs \quad \text{(Numerical Formula 1)}$$

In the high-frequency dielectric heating adhesive sheet according to the aspect of the invention, the silane coupling agent (C) preferably has a 5%-weight-reduction temperature of 120 degrees C. or more.

In the high-frequency dielectric heating adhesive sheet according to the aspect of the invention, the reactive site (Y) preferably contains at least one selected from the group consisting of a carboxy group, a hydroxyl group, an amino group, an isocyanate group, and an acid anhydride structure.

In the high-frequency dielectric heating adhesive sheet according to the aspect of the invention, the reactive site (Y) preferably contains a maleic anhydride structure.

In the high-frequency dielectric heating adhesive sheet according to the aspect of the invention, the thermoplastic resin (A) is preferably a polyolefin resin.

In the high-frequency dielectric heating adhesive sheet according to the aspect of the invention, a volume content ratio of the dielectric material in the adhesive layer is preferably in a range from 5 vol % to 50 vol %.

In the high-frequency dielectric heating adhesive sheet according to the aspect of the invention, the dielectric material is preferably a dielectric filler (B).

In the high-frequency dielectric heating adhesive sheet according to the aspect of the invention, the dielectric filler (B) preferably contains at least one selected from the group consisting of zinc oxide, silicon carbide, barium titanate, and titanium oxide.

In the high-frequency dielectric heating adhesive sheet according to the aspect of the invention, a volume average particle diameter of the dielectric filler (B) is preferably in a range from 1 μm to 30 μm. The volume average particle diameter is a volume average particle diameter obtained by measuring a particle size distribution of the dielectric filler (B) by a laser diffraction/scattering method and performing calculation from a result of the particle size distribution measurement in accordance with JIS Z 8819-2: 2001.

According to another aspect of the invention, there is provided a bonding method including: providing the high-frequency dielectric heating adhesive sheet according to the aspect of the invention between a first adherend and a second adherend; and applying a high-frequency electric field to the high-frequency dielectric heating adhesive sheet to bond the first adherend and the second adherend.

According to still another aspect of the invention, there is provided a joined body including a first adherend, a second adherend, and the high-frequency dielectric heating adhesive sheet according to the aspect of the invention, in which at least one of the first adherend or the second adherend is an adherend made of glass, and the first adherend is bonded with the second adherend via the high-frequency dielectric heating adhesive sheet.

According to the aspect of the invention, a high-frequency dielectric heating adhesive sheet bondable, even with low consumption energy, to glass with high bonding strength can be provided. According to the another aspect of the invention, a bonding method using the high-frequency dielectric heating adhesive sheet can be provided. According to the still another aspect of the invention, a joined body obtained by bonding adherends made of glass with high bonding strength can be provided.

DESCRIPTION OF EMBODIMENT(S)

Figure 1A:
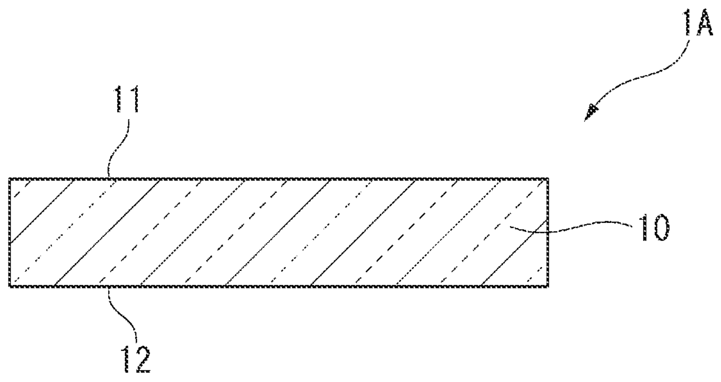
FIG. 1A is a schematic cross-sectional view of an exemplary high-frequency dielectric heating adhesive sheet.

High-Frequency Dielectric Heating Adhesive Sheet A high-frequency dielectric heating adhesive sheet according to an exemplary embodiment includes an adhesive layer. The adhesive layer contains a thermoplastic resin (A) having a reactive site (Y), a dielectric material that generates heat upon application of a high-frequency electric field, and a silane coupling agent (C). The high-frequency electric field is an electric field of which direction is reversed by high frequency waves.

The dielectric material is a material that generates heat upon application of a high-frequency electric field. Preferably, the dielectric material is a material that generates heat upon application of a high-frequency electric field having a frequency range from 3 MHz to 300 MHz. Preferably, the dielectric material is at least one of a dielectric resin or a dielectric filler. The dielectric material is more preferably a dielectric filler (B), because the dielectric filler (B) contained in the high-frequency dielectric heating adhesive sheet is not likely to deteriorate when the high-frequency dielectric heating adhesive sheet is processed.

Explanation is made below about a case where the high-frequency dielectric heating adhesive sheet according to the exemplary embodiment contains the dielectric filler (B) as the dielectric material.

Thermoplastic Resin (A) Having Reactive Site (Y)

The thermoplastic resin (A) has at least one reactive site (Y). When the thermoplastic resin (A) has two or more reactive sites (Y), the two or more reactive sites (Y) are mutually the same or different.

Examples of the reactive site (Y) of the thermoplastic resin (A) include a carboxy group, a hydroxyl group, an amino group, an isocyanate group, an epoxy group, a vinyl acetate structure, and an acid anhydride structure. The reactive site (Y) may be introduced through copolymerization or graft modification with the thermoplastic resin.

The thermoplastic resin (A) having at least one reactive site (Y) allows the silane coupling agent to act on both the reactive site (Y) of the thermoplastic resin and glass (adherend), and thus the adhesive layer of the high-frequency dielectric heating adhesive sheet is likely to firmly bond the adherends.

The reactive site (Y) of the thermoplastic resin (A) preferably contains at least one selected from the group consisting of a carboxy group, a hydroxyl group, an amino group, an isocyanate group and an acid anhydride structure, more preferably contains at least one selected from the group consisting of a carboxy group and an acid anhydride structure. When the reactive site (Y) of the thermoplastic resin (A) contains at least one of a carboxy group or an acid anhydride structure, the adhesive layer of the high-frequency dielectric heating adhesive sheet is excellent in adhesion performance and temporal stability.

A compound used for introducing the reactive site (Y) into the thermoplastic resin is exemplified by an unsaturated carboxylic acid derivative component derived from any one of an unsaturated carboxylic acid, an acid anhydride of an unsaturated carboxylic acid, and an ester of an unsaturated carboxylic acid.

Examples of the unsaturated carboxylic acid include an acrylic acid, a methacrylic acid, a maleic acid, a fumaric acid, an itaconic acid, and a citraconic acid.

Examples of the acid anhydride of the unsaturated carboxylic acid include maleic anhydride, itaconic anhydride, and citraconic anhydride.

Examples of the ester of the unsaturated carboxylic acid include methyl acrylate, ethyl acrylate, methyl methacrylate, ethyl methacrylate, butyl methacrylate, dimethyl maleate, monomethyl maleate, dimethyl fumarate, diethyl fumarate, dimethyl itaconate, diethyl itaconate, dimethyl citraconate, diethyl citraconate, and dimethyl tetrahydrophthalate anhydride.

In the following, the thermoplastic resin (A) having the reactive site (Y) is referred to as the thermoplastic resin (A).

The reactive site (Y) of the thermoplastic resin (A) preferably contains a maleic anhydride structure. The maleic anhydride structure may be a group introduced by graft-modification of a thermoplastic resin. Alternatively, the thermoplastic resin (A) may be a maleic anhydride copolymer obtained by copolymerization of a monomer having a maleic anhydride structure. The reactive site (Y) may be a structure derived from maleic anhydride in the maleic anhydride copolymer.

When the thermoplastic resin (A) contains a maleic anhydride structure as the reactive site (Y), the reactive site (Y) is likely to interact with a functional group (X) of the silane coupling agent (C). Thus, when the maleic anhydride structure is contained as the reactive site (Y), adherends are likely to be bonded more firmly.

In terms of, for example, meltability and possession of a predetermined heat resistance, the thermoplastic resin (A) is preferably at least one selected from the group consisting of a polyolefin resin, a styrene resin, a polyacetal resin, a polycarbonate resin, a polyacrylic resin, a polyamide resin, a polyimide resin, a polyvinyl acetate resin, a phenoxy resin, and a polyester resin. The thermoplastic resin (A) is more preferably a polyolefin resin.

A polyolefin resin is inexpensive and excellent in moldability and mechanical strength.

Polyolefin Resin

Examples of the polyolefin resin as the thermoplastic resin include a resin including a homopolymer such as polyethylene, polypropylene, polybutene, and polymethylpentene, and an α-olefin resin including a copolymer of a monomer selected from the group consisting of ethylene, propylene, butene, hexene, octene, and 4-methylpentene. The polyolefin resin as the thermoplastic resin may be a single type of resin or a combination of two or more types of resins.

Preferably, an olefin monomer is at least one of ethylene or propylene in view of exhibiting excellent mechanical strength and stable adhesive characteristics.

Polyolefin Resin Having Reactive Site (Y) When the polyolefin resin as the thermoplastic resin (A) is a copolymer of an olefin monomer and a monomer having the reactive site (Y), the copolymer contains a constituent unit derived from the monomer having the reactive site (Y) at a content of preferably 2 mass % or more, more preferably 4 mass % or more, still more preferably 5 mass % or more, and still further more preferably 6 mass % or more. Further, the copolymer contains a constituent unit derived from the monomer having the reactive site (Y) at a content of preferably 30 mass % or less, more preferably 25 mass % or less, still more preferably 20 mass % or less, and still further more preferably 15 mass % or less.

When the copolymer contains 2 mass % or more of a constituent unit derived from the monomer having the reactive site (Y), the bonding strength of the high-frequency dielectric heating adhesive sheet is improved. Further, when the copolymer contains 30 mass % or less of a constituent unit derived from the monomer having the reactive site (Y), an extreme increase in tackiness of the thermoplastic resin is inhibited. As a result, the high-frequency dielectric heating adhesive sheet is not likely to have difficulty in a forming process.

When the reactive site (Y) is introduced to the polyolefin resin as the thermoplastic resin (A) through graft modification, the rate of modification by the reactive site (Y) is preferably 0.01 mass % or more, more preferably 0.1 mass % or more, and still more preferably 0.2 mass % or more.

When the reactive site (Y) is introduced to the polyolefin resin as the thermoplastic resin (A) through graft modification, the rate of modification by the reactive site (Y) is preferably 30 mass % or less, more preferably 20 mass % or less, and still more preferably 10 mass % or less.

When the reactive site (Y) is introduced to the polyolefin resin as the thermoplastic resin (A) through graft modification, a rate of modification by the reactive site (Y) of 0.01 mass % or more improves the bonding strength of the high-frequency dielectric heating adhesive sheet. Further, a rate of modification by the reactive site (Y) of 30 mass % or less inhibits an extreme increase in tackiness of the thermoplastic resin (A). As a result, the high-frequency dielectric heating adhesive sheet is not likely to have difficulty in a forming process.

Herein, the rate of modification by the reactive site (Y) refers to a percentage of a mass of a site derived from the reactive site relative to a total mass of polyolefin having the reactive site (Y).

The polyolefin resin as the thermoplastic resin (A) preferably has, as the reactive site (Y), at least one of a carboxy group, a hydroxyl group, an amino group, an isocyanate group, or an acid anhydride structure, more preferably has, as the reactive site (Y), at least one of a carboxy group or an acid anhydride structure. Further preferably, the acid anhydride structure is a maleic anhydride structure.

Polyolefin Having Maleic Anhydride Structure

When polyolefin having a maleic anhydride structure is a copolymer of an olefin monomer and a monomer having a maleic anhydride structure, the ratio of a constituent unit derived from the monomer having the maleic anhydride structure in the copolymer is preferably in a range similar to that of the ratio of a constituent unit derived from a monomer having the reactive site (Y) in a copolymer of an olefin monomer and the monomer having the reactive site (Y). The effect achievable by virtue of the ratio being in the range is also similar to that achievable in a case where the polyolefin resin as the thermoplastic resin (A) is a copolymer of an olefin monomer and a monomer having the reactive site (Y).

In polyolefin having a maleic anhydride structure, the rate of modification in a case where the maleic anhydride structure is introduced by graft modification is preferably in a range similar to that of the rate of modification in a case where the reactive site (Y) is introduced to the polyolefin resin as the thermoplastic resin (A) through graft modification. The effect achievable by virtue of the rate being in the range is also similar to that achievable in a case where the reactive site (Y) is introduced to the polyolefin resin as the thermoplastic resin (A) through graft modification.

Preferably, a constituent unit derived from olefin in polyolefin having a maleic anhydride structure is a constituent unit derived from ethylene or propylene. That is, polyolefin having a maleic anhydride structure is preferably a polyethylene resin having a maleic anhydride structure or a polypropylene resin having a maleic anhydride structure.

The flow start temperature of the thermoplastic resin (A) is preferably 80 degrees C. or more, more preferably 85 degrees C. or more, still more preferably 90 degrees C. or more, and still further more preferably 95 degrees C. or more.

The flow start temperature of the thermoplastic resin (A) is preferably 300 degrees C. or less, more preferably 250 degrees C. or less, and still more preferably 200 degrees C. or less.

A flow start temperature of the thermoplastic resin (A) of 80 degrees C. or more allows the adhesive layer to easily obtain favorable heat resistance.

A flow start temperature of the thermoplastic resin (A) of 300 degrees C. or less allows the adhesive layer to easily obtain favorable adhesion performance in a short time.

The flow start temperature of the adhesive layer can be measured by a method described in Examples below.

Dielectric Filler (B)

The dielectric filler (B) generates heat upon application of a high-frequency electric field.

Preferably, the dielectric filler (B) is a filler that generates heat upon application of a high-frequency electric field having a frequency range of 3 MHz to 300 MHz. Preferably, the dielectric filler (B) is a filler that generates heat upon application of a high-frequency electric field having, within the frequency range of 3 MHz to 300 MHz, for example, a frequency of 13.56 MHz, 27.12 MHz, or 40.68 MHz.

Type of Dielectric Filler (B)

The dielectric filler (B) is preferably a single one or a combination of two or more of zinc oxide, silicon carbide (SiC), anatase-type titanium oxide, barium titanate, barium titanate zirconate, lead titanate, potassium niobate, rutile-type titanium oxide, hydrated aluminum silicate, inorganic substances having crystallization water such as hydrated aluminosilicate salt of alkali metal, and inorganic substances having crystallization water such as hydrated aluminosilicate salt of alkaline earth metal.

Preferably, the dielectric filler (B) contains at least one selected from the group consisting of zinc oxide, silicon carbide, barium titanate, and titanium oxide.

The dielectric filler (B) is further preferably zinc oxide from among the dielectric fillers exemplified above, because zinc oxide has a lot of types, and various shapes and sizes thereof are selectable, which allows for improving the adhesive characteristics and mechanical characteristics of the high-frequency dielectric heating adhesive sheet in accordance with the purpose of use. Using zinc oxide as the dielectric filler (B) results in a colorless high-frequency dielectric heating adhesive sheet. Zinc oxide is small in density among dielectric fillers. Thus, when adherends are bonded using a high-frequency dielectric heating adhesive sheet that contains zinc oxide as the dielectric filler (B), a total weight of the joined body is less likely to increase than a case where a sheet containing another dielectric filler is used. Zinc oxide, which is not extremely high in hardness among ceramics, is not likely to damage a device for producing a high-frequency dielectric heating adhesive sheet. Zinc oxide, which is an inactive oxide, is blendable with a thermoplastic resin with a small damage thereto.

Further, titanium oxide as the dielectric filler (B) is preferably at least one of anatase-type titanium oxide or rutile-type titanium oxide, more preferably anatase-type titanium oxide in terms of an excellent dielectric property.

Volume Content Ratio

The volume content ratio of the dielectric filler (B) in the adhesive layer is preferably 5 vol % or more, more preferably 8 vol % or more, and still more preferably 10 vol % or more.

The volume content ratio of the dielectric filler (B) in the adhesive layer is preferably 50 vol % or less, more preferably 40 vol % or less, still more preferably 35 vol % or less, and still further more preferably 25 vol % or less.

At a volume content ratio of the dielectric filler (B) in the adhesive layer of 5 vol % or more, heat generation performance is improved, and the adhesive layer and the adherend made of glass are likely to be firmly bonded.

At a volume content ratio of the dielectric filler (B) in the adhesive layer of 50 vol % or less, flexibility as a sheet is easily obtainable and a decrease in toughness is easily preventable, facilitating machining of the high-frequency dielectric heating adhesive sheet into a desired form in a subsequent process.

Since the thermoplastic resin (A), the dielectric filler (B), and the silane coupling agent (C) are contained in the high-frequency dielectric heating adhesive sheet according to the exemplary embodiment, the volume content ratio of the dielectric filler (B) is preferably 5 vol % or more, more preferably 8 vol % or more, and still more preferably 10 vol % or more with respect to a total volume of the thermoplastic resin (A), the dielectric filler (B), and the silane coupling agent (C). Further, the volume content ratio of the dielectric filler (B) is preferably 50 vol % or less, more preferably 40 vol % or less, still more preferably 35 vol % or less, and still further more preferably 25 vol % or less with respect to a total volume of the thermoplastic resin (A), the dielectric filler (B), and the silane coupling agent (C).

The above explanation about the volume content ratio of the dielectric material in the adhesive layer is made assuming that the dielectric material is the dielectric filler (B). The volume content ratio of the dielectric material in the adhesive layer as described above is not limited to the case where the dielectric material is the dielectric filler (B). The volume content ratio of any other dielectric material than the dielectric filler (B) also preferably has a similar range to that of the volume content ratio of the dielectric filler (B) in the adhesive layer. Specifically, the volume content ratio of the dielectric material in the adhesive layer is preferably in a range from 5 vol % to 50 vol %.

Average Particle Diameter

The volume average particle diameter of the dielectric filler (B) is preferably 1 μm or more, more preferably 2 μm or more, and still more preferably 3 μm or more.

The volume average particle diameter of the dielectric filler (B) is preferably 30 μm or less, more preferably 25 μm or less, and still more preferably 20 μm or less.

At a volume average particle diameter of the dielectric filler (B) of 1 μm or more, the high-frequency dielectric heating adhesive sheet exhibits high heat generation performance upon application of a high-frequency electric field, and the adhesive layer and the adherend made of glass can be firmly bonded in a short time.

At a volume average particle diameter of the dielectric filler (B) of 30 μm or less, the high-frequency dielectric heating adhesive sheet exhibits high heat generation performance upon application of a high-frequency electric field, and the adhesive layer and the adherend made of glass can be firmly bonded in a short time. Further, a decrease in strength of the high-frequency dielectric heating adhesive sheet is preventable at a volume average particle diameter of the dielectric filler (B) of 30 μm or less.

The volume average particle diameter of the dielectric filler (B) is measured by a method as described below. A particle size distribution of the dielectric filler (B) is measured by a laser diffraction/scattering method and the volume average particle diameter is calculated from a result of the particle size distribution measurement in accordance with JIS Z 8819-2: 2001.

In the high-frequency dielectric heating adhesive sheet according to the exemplary embodiment, an average particle diameter $D_F$ of the dielectric filler (B) and a thickness T of the adhesive layer preferably satisfy a relation of $1 \leq T/D_F \leq 2500$.

$T/D_F$ is preferably 1 or more, preferably 2 or more, preferably 5 or more, more preferably 10 or more, and still more preferably 20 or more. When $T/D_F$ is 1 or more, a decrease in bonding strength due to the contact between the dielectric filler (B) and the adherend at the time of bonding is preventable.

$T/D_F$ is preferably 2,500 or less, preferably 2,000 or less, preferably 1,750 or less, more preferably 1,000 or less, still more preferably 500 or less, still further more preferably 100 or less, and yet still further more preferably 50 or less. When $T/D_F$ is 2,500 or less, a load on a sheet production device during production of the high-frequency dielectric heating adhesive sheet can be reduced.

Silane Coupling Agent (C)

The volume content ratio of the silane coupling agent (C) in the adhesive layer is preferably 0.5 vol % or more, more preferably 1 vol % or more, still more preferably 3 vol % or more, and still further more preferably 5 vol % or more.

The volume content ratio of the silane coupling agent (C) in the adhesive layer is preferably 25 vol % or less, more preferably 20 vol % or less, still more preferably 15 vol % or less, still further more preferably 12 vol % or less, and yet still further more preferably 10 vol % or less.

At a volume content ratio of the silane coupling agent (C) in the adhesive layer of 0.5 vol % or more, the adhesive layer and the adherend(s) made of glass are likely to be firmly bonded.

A volume content ratio of the silane coupling agent (C) in the adhesive layer of 25 vol % or less facilitates the bonding strength.

At a volume content ratio of the silane coupling agent (C) in the adhesive layer of 10 vol % or less, the silane coupling agent (C) is not likely to bleed out of the adhesive layer.

A well-known silane coupling agent is usable as the silane coupling agent (C). The silane coupling agent (C) is preferably an organosilicon compound having at least one alkoxysilyl group in a molecule.

Examples of the silane coupling agent include: a silane coupling agent having a (meth)acryloyl group such as 3-methacryloxypropyl methyldimethoxysilane, 3-methacryloxypropyl trimethoxysilane, 3-methacryloxypropyl methyldiethoxysilane, 3-methacryloxypropyl triethoxysilane, 3-acryloxypropyl trimethoxysilane, and 8-methacryloxyoctyl trimethoxysilane; a silane coupling agent having a vinyl group such as vinyltrimethoxysilane, vinyltriethoxysilane, dimethoxymethylvinylsilane, diethoxymethylvinylsilane, trichlorovinylsilane, vinyltris(2-methoxyethoxy)silane, and 6-octenyltrimethoxysilane; a silane coupling agent having an epoxy group such as 2-(3,4-epoxycyclohexyl)ethyl trimethoxysilane, 3-glycidoxypropyl trimethoxysilane, 3-glycidoxypropyl methyldiethoxysilane, 3-glycidoxypropyl triethoxysilane, and 8-glycidoxyoctyl trimethoxysilane; a silane coupling agent having a styryl group such as p-styryl trimethoxysilane and p-styryl triethoxysilane; a silane coupling agent having an amino group such as N-(2-aminoethyl)-3-aminopropyl methyldimethoxysilane, N-(2-aminoethyl)-3-aminopropyl trimethoxysilane, N-(2-aminoethyl)-3-aminopropyl triethoxysilane, N-2-(aminoethyl)-8-aminooctyl trimethoxysilane, 3-aminopropyl trimethoxysilane, 3-aminopropyl triethoxysilane, 3-trethoxysilyl-N-(1,3-dimethylbutylidene)propylamine, N-phenyl-3-aminopropyl trimethoxysilane, and hydrochloride of N-(vinylbenzyl)-2-aminoethyl-3-aminopropyl trimethoxysilane; a silane coupling agent having an ureido group such as 3-ureidopropyl trimethoxysilane and 3-ureidopropyl triethoxysilane; a silane coupling agent having a halogen atom such as 3-chloropropyl trimethoxysilane and 3-chloropropyl triethoxysilane; a silane coupling agent having a mercapto group such as 3-mercaptopropyl methyldimethoxysilane and 3-mercaptopropyl trimethoxysilane; a silane coupling agent having a sulfide group such as bis(trimethoxysilylpropyl) tetrasulfide and bis(triethoxysilylpropyl) tetrasulfide; a silane coupling agent having an isocyanate group such as 3-isocyanatepropyl trimethoxysilane and 3-isocyanatepropyl triethoxysilane; a silane coupling agent having an allyl group such as allyltrichlorosilane, allyltriethoxysilane, and allyltrimethoxysilane; and a silane coupling agent having a hydroxyl group such as 3-hydroxypropyl trimethoxysilane and 3-hydroxypropyl triethoxysilane. Herein, the "(meth) acryloyl" is used as a term referring to both "acryloyl" and "methacryloyl". The same applies to other similar terms.

The silane coupling agent (C) preferably contains a functional group (X) and an alkoxysilyl group (Z).

The number of atoms of a main chain linking the functional group (X) with a silicon atom of the alkoxysilyl group (Z) is preferably six or more, more preferably eight or more.

The number of atoms of a main chain linking the functional group (X) with a silicon atom of the alkoxysilyl group (Z) is preferably 50 or less, more preferably 30 or less, still more preferably 20 or less, and still further more preferably 15 or less.

The number of atoms of a main chain linking the functional group (X) with a silicon atom of the alkoxysilyl group (Z) is the number of atoms on the main chain. The number of atoms of side chains bonded to atoms forming the main chain, the number of hydrogen atoms, and the number of atoms other than the hydrogen atoms (e.g., when the main chain contains ketone, an oxygen atom bonded to a carbon atom of ketone) are not included therein.

When the number of atoms of a main chain linking the functional group (X) with a silicon atom of the alkoxysilyl group (Z) is six or more, the silane coupling agent (C) is not likely to volatize during melt kneading of adhesive layer materials, making it possible to easily control a content of the silane coupling agent in the adhesive layer.

When the number of atoms of a main chain linking the functional group (X) with a silicon atom of the alkoxysilyl group (Z) is 50 or less, reactivity of the reactive site (Y) of the thermoplastic resin (A) and the functional group (X) of the silane coupling agent (C) is not likely to decrease.

For example, in a case of 8-glycidoxyoctyl trimethoxysilane, the number of atoms of a main chain linking the functional group (X) with a silicon atom of the alkoxysilyl group (Z) is 10 as shown below.

[Formula 1]

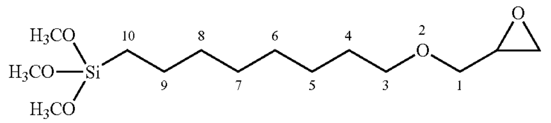

For example, in a case of N-2-(aminoethyl)-8-aminooctyl trimethoxysilane, the number of atoms of a main chain linking the functional group (X) with a silicon atom of the alkoxysilyl group (Z) is 11 as shown below.

[Formula 2]

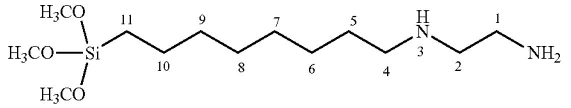

Further, the functional group (X) of the silane coupling agent (C) is a functional group bonded to an end of a main chain bonded to a silicon atom of the alkoxysilyl group (Z). For example, in a case of 8-glycidoxyoctyl trimethoxysilane, an epoxy group bonded to an end of the main chain is the functional group (X), and the ether bond in the main chain is not included in the functional group (X). Further, for example, in a case of N-2-(aminoethyl)-8-aminooctyl trimethoxysilane, an amino group ($—NH_2$) bonded to an end of the main chain is the functional group (X). An amino group (—NH—) in the main chain is not included in the functional group (X). Furthermore, when a chain bonded to a silicon atom of the alkoxysilyl group (Z) includes a plurality of branched chains having functional groups (X) at their ends, the functional groups (X) in the silane coupling agent (C) are mutually the same or different. In a case of including a plurality of branched chains having functional groups (X) at their ends, the main chain is a chain having a largest number of atoms linking the functional group (X) and a silicon atom of the alkoxysilyl group (Z).

Preferably, the functional group (X) is at least one group selected from the group consisting of an epoxy group, an amino group, an isocyanate group, and a mercapto group. More preferably, the functional group (X) is at least one group selected from the group consisting of an epoxy group and an amino group. Since the epoxy group and the amino group as the functional group (X) readily interact with the reactive site (Y) of the thermoplastic resin (A), the silane coupling agent (C) is not likely to bleed out of the adhesive layer. When the silane coupling agent (C) has an epoxy group and an amino group as the functional group (X), the reactive site (Y) of the thermoplastic resin (A) is preferably a maleic anhydride structure.

The silane coupling agent (C) is preferably at least one of 8-glycidoxyoctyl trimethoxysilane or 3-glycidoxypropyl trimethoxysilane.

8-glycidoxyoctyl trimethoxysilane is preferably used in view of processability of the adhesive sheet to be manufactured, and 3-glycidoxypropyl trimethoxysilane is preferably used in view of production cost.

The adhesive sheet may contain a single type of silane coupling agent (C) or two or more of silane coupling agents (C).

The molecular weight of the silane coupling agent (C) is preferably 200 or more, more preferably 225 or more, still more preferably 250 or more, and still further more preferably 280 or more.

The molecular weight of the silane coupling agent (C) is preferably 1,000 or less, more preferably 600 or less, still more preferably 500 or less, and still further more preferably 400 or less.

A molecular weight of the silane coupling agent (C) of 200 or more is not likely to cause unexpected reaction during processing.

When the molecular weight of the silane coupling agent (C) is 250 or more, the silane coupling agent (C) is not likely to volatize during melt kneading of adhesive layer materials, making it possible to easily control a content of the silane coupling agent in the adhesive layer.

When the molecular weight of the silane coupling agent (C) is 1,000 or less, reactivity of the reactive site (Y) of the thermoplastic resin (A) and the functional group (X) of the silane coupling agent (C) is not likely to decrease.

A difference ΔT between a 5%-weight-reduction temperature Td5 of the silane coupling agent (C) and a flow start temperature Tfs of the thermoplastic resin (A), represented by a numerical formula (Numerical Formula 1) below, is preferably −20 degrees C. or more, more preferably −10 degrees C. or more, still more preferably 0 degrees C. or more, still further more preferably 10 degrees C. or more, and yet still further more preferably 20 degrees C. or more.

$$\Delta T = Td5 - Tfs \quad \text{(Numerical Formula 1)}$$

The difference ΔT between the 5%-weight-reduction temperature Td5 of the silane coupling agent (C) and the flow start temperature Tfs of the thermoplastic resin (A), represented by the numerical formula (Numerical Formula 1), is preferably 200 degrees C. or less, more preferably 150 degrees C. or less, and still more preferably 100 degrees C. or less.

When the difference ΔT is −20 degrees C. or more, the adhesive layer is not likely to be colored which may otherwise be caused by a large amount of degradants of the silane coupling agent (C) during melt kneading of adhesive layer materials.

When the difference ΔT is 0 degrees C. or more, the silane coupling agent (C) is not likely to volatize during melt kneading of adhesive layer materials, making it possible to easily control a content of the silane coupling agent in the adhesive layer.

A difference ΔT of 200 degrees C. or less easily exhibits dispersibility during melt kneading of adhesive layer materials.

The 5%-weight-reduction temperature of the silane coupling agent (C) is preferably 120 degrees C. or more, more preferably 140 degrees C. or more, still more preferably 150 degrees C. or more, still further more preferably 160 degrees C. or more, and yet still further more preferably 180 degrees C. or more.

Typically, the 5%-weight-reduction temperature of the silane coupling agent (C) is 300 degrees C. or less.

A 5%-weight-reduction temperature of the silane coupling agent (C) of 120 degrees C. or more easily provides temporal stability.

When the 5%-weight-reduction temperature of the silane coupling agent (C) is 150 degrees C. or more, the silane coupling agent (C) is not likely to volatize during melt kneading of adhesive layer materials, making it possible to easily control a content of the silane coupling agent in the adhesive layer.

Additives

The high-frequency dielectric heating adhesive sheet according to the exemplary embodiment may or may not contain an additive. When the high-frequency dielectric heating adhesive sheet according to the exemplary embodiment includes a plurality of layers, at least one of the layers may or may not contain an additive. When at least one of the layers contains an additive, the adhesive layer may or may not contain an additive.

When the high-frequency dielectric heating adhesive sheet according to the exemplary embodiment contains an additive, examples of the additive include a tackifier, a plasticizer, a wax, a colorant, an antioxidant, an ultraviolet absorber, an antimicrobial agent, a viscosity modifier, an organic filler, and an inorganic filler. The organic filler and inorganic filler as the additive are different from the dielectric material (dielectric filler).

The tackifier and plasticizer allow for improving the melting characteristics and adhesive characteristics of the high-frequency dielectric heating adhesive sheet.

Examples of the tackifier include a rosin derivative, a polyterpene resin, an aromatic modified terpene resin, a hydride of an aromatic modified terpene resin, a terpene phenol resin, a coumarone-indene resin, an aliphatic petroleum resin, an aromatic petroleum resin, and a hydride of an aromatic petroleum resin.

Examples of the plasticizer include a petroleum process oil, a natural oil, diacid dialkyl, and a low-molecular-weight liquid polymer. Examples of the petroleum process oil include a paraffin process oil, a naphthene process oil, and an aromatic process oil. Examples of the natural oil include a castor oil and a tall oil. Examples of diacid dialkyl include dibutyl phthalate, dioctyl phthalate, and dibutyl adipate. Examples of the low-molecular-weight liquid polymer include liquid polybutene and liquid polyisoprene.

When the high-frequency dielectric heating adhesive sheet according to the exemplary embodiment contains an additive, the content ratio of the additive in the high-frequency dielectric heating adhesive sheet is, normally, based on a total mass of the high-frequency dielectric heating adhesive sheet, preferably 0.01 mass % or more, more preferably 0.05 mass % or more, and still more preferably 0.1 mass % or more. Further, the content ratio of the additive in the high-frequency dielectric heating adhesive sheet is preferably 20 mass % or less, more preferably 15 mass % or less, and still more preferably 10 mass % or less.

The high-frequency dielectric heating adhesive sheet according to the exemplary embodiment preferably contains no solvent. The high-frequency dielectric heating adhesive sheet containing no solvent is not likely to have a problem of volatile organic compounds (VOC) that may otherwise be caused by an adhesive agent used for bonding with an adherend.

Preferably, the adhesive layer of the high-frequency dielectric heating adhesive sheet according to the exemplary embodiment contains no conductive substance such as a metal, carbon, or a carbon compound containing carbon as a main component (e.g., carbon black). Preferably, the adhesive layer does not contain, for example, carbon steel, a iron, y iron, 6 iron, copper, brass, aluminum, iron-nickel alloy, iron-nickel-chromium alloy, carbon fiber, and carbon black.

When the adhesive layer contains conductive substances, the content ratios of the conductive substances in the adhesive layer are each independently, based on a total mass of the adhesive layer, preferably 20 mass % or less, more preferably 10 mass % or less, still more preferably 5 mass % or less, still further more preferably 1 mass % or less, and yet still further more preferably 0.1 mass % or less.

Particularly preferably, the adhesive layer contains 0 mass % of the conductive substances.

When the adhesive layer contains 20 mass % or less of conductive substances, a problem of carbonization of a bonding portion and an adherend caused by electrical breakdown in a dielectric heating treatment is easily preventable.

The total of the content ratios of the thermoplastic resin (A), the dielectric filler (B), and the silane coupling agent (C) in the adhesive layer of the high-frequency dielectric heating adhesive sheet according to the exemplary embodiment is preferably 80 mass % or more, more preferably 90 mass % or more, and still more preferably 99 mass % or more.

An exemplary high-frequency dielectric heating adhesive sheet according to the exemplary embodiment consists of a single adhesive layer with the high-frequency dielectric adhesive property. Note that the high-frequency dielectric heating adhesive sheet according to the invention is not limited to the above exemplary sheet (sheet consisting of a single adhesive layer), but is also exemplified by a high-frequency dielectric heating adhesive sheet including any other layer than the adhesive layer.

As described above, the high-frequency dielectric heating adhesive sheet may consist of a single adhesive layer with the high-frequency dielectric adhesive property. Thus, herein, the terms "high-frequency dielectric heating adhesive sheet" and "adhesive layer" are occasionally interchangeable.

Figure 1B:
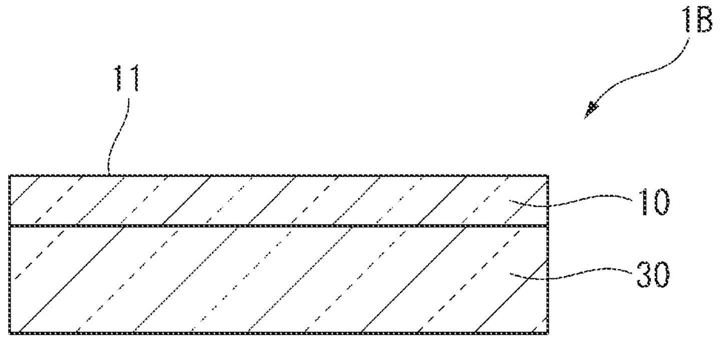
FIG. 1B is a schematic cross-sectional view of another exemplary high-frequency dielectric heating adhesive sheet.
Figure 1C:
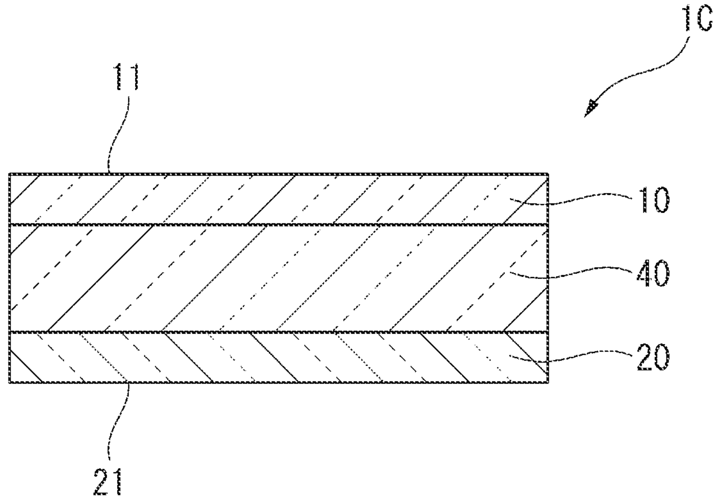
FIG. 1C is a schematic cross-sectional view of still another exemplary high-frequency dielectric heating adhesive sheet.

FIGS. 1A to 1C are schematic diagrams of multiple examples of the high-frequency dielectric heating adhesive sheet according to the exemplary embodiment.

A high-frequency dielectric heating adhesive sheet 1A shown in FIG. 1A consists of a single adhesive layer 10. The high-frequency dielectric heating adhesive sheet 1A has a first surface 11 and a second surface 12 opposite the first surface 11.

Preferably, the high-frequency dielectric heating adhesive sheet consists of a single adhesive layer. The high-frequency dielectric heating adhesive sheet consisting of a single adhesive layer can have a small thickness and be easy to form.

A high-frequency dielectric heating adhesive sheet 1B shown in FIG. 1B includes the adhesive layer 10 and a base material 30 supporting the adhesive layer 10. Similar to the high-frequency dielectric heating adhesive sheet 1A, the adhesive layer 10 has the first surface 11. The base material 30, which may be any member that can support the adhesive layer 10, is exemplified by a resin film or a resin sheet that contains at least one resin selected from the group consisting of a polyolefin resin such as a polyethylene resin and a polypropylene resin, a polyester resin such as a polybutylene terephthalate resin and a polyethylene terephthalate resin, an acetate resin, an ABS resin, a polystyrene resin, and a vinyl chloride resin. The base material 30 may contain the dielectric filler (B). The dielectric filler (B) in the adhesive layer 10 and the dielectric filler in the base material 30 are mutually the same or different.

A high-frequency dielectric heating adhesive sheet 1C shown in FIG. 1C includes the adhesive layer 10, an adhesive layer 20, and an intermediate layer 40 provided between the adhesive layer 10 and the adhesive layer 20. The high-frequency dielectric heating adhesive sheet 1C has the first surface 11 and a second surface 21 that are opposite surfaces. The adhesive layer 10 of the high-frequency dielectric heating adhesive sheet 1C is occasionally referred to as a first adhesive layer, and the adhesive layer 20 is occasionally referred to as a second adhesive layer. In a high-frequency dielectric heating adhesive sheet in which the intermediate layer is provided between the first adhesive layer and the second adhesive layer, it is only required that the first adhesive layer satisfies the conditions for the adhesive layer of the high-frequency dielectric heating adhesive sheet according to the exemplary embodiment. In an example, both the first adhesive layer and the second adhesive layer have the same composition and characteristics. In another example, the second adhesive layer is a high-frequency dielectric heating adhesive layer different from the first adhesive layer in at least one of the composition or the characteristics. In still another example, the second adhesive layer is a normal adhesive agent layer different from the high-frequency dielectric heating adhesive layer, and the second adhesive layer without high-frequency dielectric heating adhesive property is exemplified by a dry-solidifying-type adhesive agent layer that is dried and solidified by evaporation of water or a solvent, or a sticky agent layer formed from a sticky agent (pressure-sensitive adhesive agent).

Form and Characteristics of High-Frequency Dielectric Heating Adhesive Sheet

An exemplary high-frequency dielectric heating adhesive sheet according to the exemplary embodiment may consist of a single adhesive layer, and another exemplary high-frequency dielectric heating adhesive sheet according to the exemplary embodiment may include a plurality of layers. In the high-frequency dielectric heating adhesive sheet consisting of a single adhesive layer, the adhesive layer itself corresponds to the high-frequency dielectric heating adhesive sheet. The form and characteristics of the high-frequency dielectric heating adhesive sheet thus correspond to those of the adhesive layer.

Thickness of High-Frequency Dielectric Heating Adhesive Sheet

The thickness of the high-frequency dielectric heating adhesive sheet according to the exemplary embodiment is preferably 5 μm or more, more preferably 10 μm or more, still more preferably 30 μm or more, and still further more preferably 50 μm or more.

The high-frequency dielectric heating adhesive sheet having a thickness of 5 μm or more is likely to conform to irregularities of the adherend in bonding thereto, readily exhibiting the bonding strength.

When the high-frequency dielectric heating adhesive sheet has a multilayer configuration provided by a plurality of layers, the thickness of the adhesive layer is preferably 5 μm or more, more preferably 10 μm or more, still more preferably 30 μm or more, and still further more preferably 50 μm or more.

In the high-frequency dielectric heating adhesive sheet having a multilayer configuration, the adhesive layer having a thickness of 5 μm or more is likely to conform to irregularities of the adherend in bonding thereto, readily exhibiting the bonding strength.

The upper limit of the thickness of the high-frequency dielectric heating adhesive sheet is not particularly limited. Since a weight of the entire joined body obtained by bonding the high-frequency dielectric heating adhesive sheet to the adherend increases with an increase in thickness of the high-frequency dielectric heating adhesive sheet, the thickness of the high-frequency dielectric heating adhesive sheet is preferably in a range causing no problem during actual use. In consideration of practicality and formability of the high-frequency dielectric heating adhesive sheet, the thickness of the high-frequency dielectric heating adhesive sheet is preferably 2,000 μm or less, more preferably 1,000 μm or less, and still more preferably 600 μm or less.

Method of Producing High-Frequency Dielectric Heating Adhesive Sheet

The high-frequency dielectric heating adhesive sheet formed of a single layer is producible by: premixing the above components; kneading and molding the premixed components using an extruder and a known kneader such as a heat roller through a known molding process such as extrusion molding, calender molding, injection molding, and casting.

When the high-frequency dielectric heating adhesive sheet according to the exemplary embodiment has a multilayer configuration, the high-frequency dielectric heating adhesive sheet is producible, for example, by premixing the above components and performing a co-extrusion technique using a multilayer extruder. Alternatively, the sheet having a multilayer configuration is also producible by separately forming single-layered sheets (e.g., the first adhesive layer, the intermediate layer, and the second adhesive layer) constituting the high-frequency dielectric heating adhesive sheet according to the exemplary embodiment and layering the single-layered sheets through a lamination treatment. The lamination treatment for the single-layered sheets is performed, for example, by a heat laminator.

Further, the high-frequency dielectric heating adhesive sheet according to the exemplary embodiment is also producible by heat extrusion coating in which a base material is coated with a molten adhesive layer, hot melt coating, or wet coating in which a base material is coated with a coating liquid obtained by dissolving or dispersing an adhesive layer composition into a solvent.

Usage of High-Frequency Dielectric Heating Adhesive Sheet

The high-frequency dielectric heating adhesive sheet according to the exemplary embodiment is usable for bonding with an adherend. Further, the high-frequency dielectric heating adhesive sheet according to the exemplary embodiment is also usable for bonding a plurality of adherends.

The material used for the adherend is not particularly limited. The material used for the adherend may be any one of an organic material and an inorganic material (including a metal material and the like), or may be a composite of the organic and inorganic materials.

Examples of the organic material as the material of the adherend include a plastic material and a rubber material. Examples of the plastic material include a polypropylene resin, a polyethylene resin, a polyurethane resin, an acrylonitrile-butadiene-styrene copolymer resin (ABS resin), a polycarbonate resin (PC resin), a polyamide resin (e.g., nylon 6 and nylon 66), a polyester resin (e.g., polyethylene terephthalate (PET resin) and polybutylene terephthalate resin (PBT resin)), a polyacetal resin (POM resin), a polymethyl methacrylate resin, and a polystyrene resin. Examples of the rubber material include styrene-butadiene rubber (SBR), ethylene propylene rubber (EPR), and silicone rubber. The adherend may be a foam of the organic material.

Examples of the inorganic material as the material of the adherend include a glass material, a cement material, a ceramic material, and a metal material. Further, the adherend may be a fiber reinforced resin (fiber reinforced plastics (FRP)) that is a composite material of fibers and the above plastic material. The plastic material in the fiber-reinforced resin is at least one resin selected from the group consisting of a polypropylene resin, a polyethylene resin, a polyurethane resin, an acrylonitrile-butadiene-styrene copolymer resin (ABS resin), a polycarbonate resin (PC resin), a polyamide resin (e.g., nylon 6 and nylon 66), a polyester resin (polyethylene terephthalate (PET resin) and a polybutylene terephthalate resin (PBT resin)), a polyacetal resin (POM resin), a polymethyl methacrylate resin, and a polystyrene resin. Examples of fiber in the fiber-reinforced resin include a glass fiber, a Kevlar fiber, and a carbon fiber.

In a case of bonding a plurality of adherends with the high-frequency dielectric heating adhesive sheet according to the exemplary embodiment, the material of the adherends are the same or different.

The high-frequency dielectric heating adhesive sheet according to the exemplary embodiment is suitably usable for bonding with an adherend made of glass. In a case of bonding a plurality of adherends, if at least one of the adherends is made of glass, the high-frequency dielectric heating adhesive sheet according to the exemplary embodiment can be firmly bonded to the adherend made of glass.

Although the adherend may have any shape, the adherend preferably has a surface to which the high-frequency dielectric heating adhesive sheet is bondable. A sheet-shaped or plate-shaped adherend is preferable. In a case of bonding a plurality of adherends, the shape and size thereof may be the same or different.

Bonding Method

A bonding method according to the exemplary embodiment includes a step of providing a high-frequency dielectric heating adhesive sheet between a first adherend and a second adherend and a step of applying a high-frequency electric field to the high-frequency dielectric heating adhesive sheet to bond the first adherend and the second adherend.

An exemplary bonding method according to the exemplary embodiment is explained below, using an example where a first adherend is bonded with a second adherend using a high-frequency dielectric heating adhesive sheet formed of a single adhesive layer. The invention, however, is not limited to this example. The material of the second adherend is also not particularly limited.

An exemplary bonding method according to the exemplary embodiment includes a step P1 and a step P2 as below.

Step P1

The step P1 is a step for providing the high-frequency dielectric heating adhesive sheet according to the exemplary embodiment between the first adherend and the second adherend. In the step P1, the first adherend made of glass is brought into contact with a first surface of the high-frequency dielectric heating adhesive sheet. Further, in the step P1, the second adherend is brought into contact with a second surface of the high-frequency dielectric heating adhesive sheet.

Preferably, the high-frequency dielectric heating adhesive sheet is held between the first adherend and the second adherend so that the first adherend is bondable to the second adherend. The high-frequency dielectric heating adhesive sheet may be held between the first adherend and the second adherend to partially overlap with the first and second adherends, the high-frequency dielectric heating adhesive sheets may be held at multiple portions between the first adherend and the second adherend, or the high-frequency dielectric heating adhesive sheet may be held between the first adherend and the second adherend to entirely overlap with the first and second adherends. In order to enhance the bonding strength between the first adherend and the second adherend, the high-frequency dielectric heating adhesive sheet is preferably held to entirely overlap with the adhesive surfaces of the first adherend and the second adherend.

Further, as an exemplary arrangement in which the high-frequency dielectric heating adhesive sheet is held between the first adherend and the second adherend to partially overlap with the first and second adherends, the high-frequency dielectric heating adhesive sheet, which is frame-shaped, may be placed along outer circumferences of the adhesive surfaces of the first adherend and the second adherend to be held between the first adherend and the second adherend. Such a frame-shaped arrangement of the high-frequency dielectric heating adhesive sheet provides the bonding strength between the first adherend and the second adherend, and reduces the weight of the joined body as compared with an arrangement in which the high-frequency dielectric heating adhesive sheet is placed to entirely overlap with the adhesive surfaces of the adherends.

Further, when the high-frequency dielectric heating adhesive sheet is held between the first adherend and the second adherend to partially overlap with the first and second adherends, the size of the high-frequency dielectric heating adhesive sheet in use is small. A time for the high-frequency dielectric heating treatment can thus be shortened as compared with an arrangement in which the high-frequency dielectric heating adhesive sheet is placed to entirely overlap with the adhesive surfaces of the adherends Step P2

The step P2 is a step of applying a high-frequency electric field in a range from 3 MHz to 300 MHz to the high-frequency dielectric heating adhesive sheet held between the first adherend and the second adherend in the step P1 to bond the first adherend and the second adherend via the high-frequency dielectric heating adhesive sheet.

For example, a high-frequency electric field can be applied to the high-frequency dielectric heating adhesive sheet using a dielectric heating adhesion device. Herein, a "dielectric heating device" is occasionally referred to as the "dielectric heating adhesion device" or "high-frequency dielectric heating device".

Figure 2:
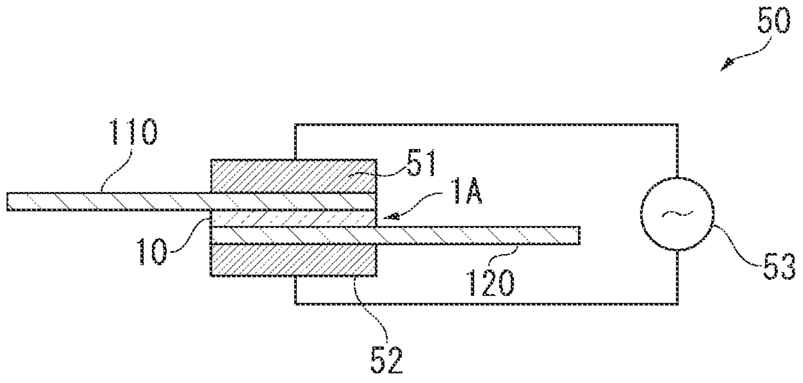
FIG. 2 is schematic diagram for illustrating a high-frequency dielectric heating treatment using the exemplary high-frequency dielectric heating adhesive sheet and a dielectric heating device.

FIG. 2 is a schematic diagram illustrating a high-frequency dielectric heating treatment using the high-frequency dielectric heating adhesive sheet according to the exemplary embodiment and a dielectric heating device.

Dielectric Heating Adhesion Device

FIG. 2 schematically shows a dielectric heating adhesion device 50.

The dielectric heating adhesion device 50 includes a first high-frequency electric field application electrode 51, a second high-frequency electric field application electrode 52, and a high-frequency power source 53.

The first high-frequency electric field application electrode 51 faces the second high-frequency electric field application electrode 52. The first high-frequency electric field application electrode 51 and the second high-frequency electric field application electrode 52 include a press mechanism. The press mechanism enables a first adherend 110, the high-frequency dielectric heating adhesive sheet 1A, and a second adherend 120 to be subjected to a pressure treatment between the first high-frequency electric field application electrode 51 and the second high-frequency electric field application electrode 52.

When the first high-frequency electric field application electrode 51 and the second high-frequency electric field application electrode 52 are in the form of a pair of plate electrodes parallel with each other, such an electrode arrangement is occasionally referred to as a parallel-plate type.

A high-frequency dielectric heating device in a parallel-plate type is also preferably used to apply a high-frequency electric field. The parallel-plate high-frequency dielectric heating device causes high-frequency waves to penetrate through the high-frequency dielectric heating adhesive sheet placed between the electrodes, making it possible to heat the whole of the high-frequency dielectric heating adhesive sheet and to bond the adherends with the high-frequency dielectric heating adhesive sheet in a short time.

The first high-frequency electric field application electrode 51 and the second high-frequency electric field application electrode 52 are each connected to the high-frequency power source 53 for applying a high-frequency electric field having, for example, a frequency of approximately 13.56 MHz, approximately 27.12 MHz, or approximately 40.68 MHz.

As shown in FIG. 2, the dielectric heating adhesion device 50 performs a dielectric heating treatment with the high-frequency dielectric heating adhesive sheet 1A being interposed between the first adherend 110 and the second adherend 120. Further, the dielectric heating adhesion device 50 performs, in addition to the dielectric heating treatment, a pressure treatment using the first high-frequency electric field application electrode 51 and the second high-frequency electric field application electrode 52 to bond the first adherend 110 and the second adherend 120. Note that the first adherend 110 and the second adherend 120 may be bonded to each other without performing the pressure treatment.

When a high-frequency electric field is applied to between the first high-frequency electric field application electrode 51 and the second high-frequency electric field application electrode 52, the dielectric filler (not shown in the drawings), which is dispersed in adhesive agent components of the high-frequency dielectric heating adhesive sheet 1A, absorbs energy of high-frequency waves.

The dielectric filler functions as a heat generation source. The heat generation of the dielectric filler melts thermoplastic resin components, eventually making it possible to firmly bond the first adherend 110 and the second adherend 120 in a short-time.

The first high-frequency electric field application electrode 51 and the second high-frequency electric field application electrode 52, which include the press mechanism, also function as a press device. In this arrangement, pressure is applied in compression directions by the first high-frequency electric field application electrode 51 and the second high-frequency electric field application electrode 52, and the high-frequency dielectric heating adhesive sheet 1A is melt by heating. The first adherend 110 and the second adherend 120 are thus more firmly bonded.

A joined body according to the exemplary embodiment includes a first adherend, a second adherend, and the high-frequency dielectric heating adhesive sheet according to the exemplary embodiment. In the joined body, at least one of the first adherend or the second adherend is an adherend made of glass. The first adherend is bonded with the second adherend via the high-frequency dielectric heating adhesive sheet.

The joined body according to the exemplary embodiment is exemplified by a joined body including the first adherend 110, the high-frequency dielectric heating adhesive sheet 1A, and the second adherend 120, as shown in FIG. 2.

High-Frequency Dielectric Heating Adhesive Conditions

High-frequency dielectric heating adhesive conditions can be modified as appropriate but the following conditions are preferable.

The output of the high-frequency electric field is preferably 10 W or more, more preferably 30 W or more, still more preferably 50 W or more, and still further more preferably 80 W or more.

The output of the high-frequency electric field is preferably 50,000 W or less, more preferably 20,000 W or less, still more preferably 15,000 W or less, still further more preferably 10,000 W or less, and yet still further more preferably 1,000 W or less.

An output of the high-frequency electric field of 10 W or more is not likely to cause a problem in which the temperature has difficulty in increasing in the dielectric heating treatment. Thus, a sufficient adhesion force is easily obtained.

An output of the high-frequency electric field output of 50,000 W or less is not likely to cause a problem in which temperature control by the dielectric heating treatment is difficult.

The application time of the high-frequency electric field is preferably one second or more.

The application time of the high-frequency electric field is preferably 300 seconds or less, more preferably 240 seconds or less, still more preferably 180 seconds or less, still further more preferably 120 seconds or less, and yet still further more preferably 100 seconds or less.

An application time of the high-frequency electric field of one second or more is not likely to cause a problem in which the temperature has difficulty in increasing in the dielectric heating treatment. Thus, a sufficient adhesion force is easily obtained.

An application time of the high-frequency electric field of 300 seconds or less is not likely to cause problems of a decrease in production efficiency of the joined body obtained by bonding the first adherend and the second adherend, an increase in production costs, and heat deterioration of the adherends.

The frequency of the high-frequency electric field to be applied is preferably 1 kHz or more, more preferably 1 MHz or more, still more preferably 5 MHz or more, and still further more preferably 10 MHz or more.

The frequency of the high-frequency electric field to be applied is preferably 300 MHz or less, more preferably 100 MHz or less, still more preferably 80 MHz or less, and still further more preferably 50 MHz or less. Specifically, an industrial frequency band of 13.56 MHz, 27.12 MHz, or 40.68 MHz, which is designated by the International Telecommunication Union, is also usable for the high-frequency dielectric heating bonding method (bonding method) of the exemplary embodiment.

Effects of Exemplary Embodiment

The high-frequency dielectric heating adhesive sheet according to the exemplary embodiment is bondable, even with low consumption energy, to glass with high bonding strength.

The high-frequency dielectric heating adhesive sheet according to the exemplary embodiment is not only easy to handle but also improved in workability in bonding to the adherend as compared with a case where an adhesive agent required to be applied is used.

The high-frequency dielectric heating adhesive sheet according to the exemplary embodiment is excellent in water resistance and moisture resistance as compared with a typical sticky agent.

The high-frequency dielectric heating adhesive sheet according to the exemplary embodiment, which is heated through application of a high-frequency electric field, is locally heated. Thus, the high-frequency dielectric heating adhesive sheet according to the exemplary embodiment is not likely to have a problem in which the entire adherend melts at the time of bonding.

In the bonding method using the high-frequency dielectric heating adhesive sheet according to the exemplary embodiment, only a predetermined portion can be locally heated by a dielectric heating adhesion device from the outside. Thus, even when the adherend is in the form of a large-sized and complicated three-dimensional structure, a thickened and complicated three-dimensional structure, or the like, and in addition, high dimensional accuracy is required, the bonding method using the high-frequency dielectric heating adhesive sheet according to the exemplary embodiment is beneficial.

Further, the thickness or the like of the high-frequency dielectric heating adhesive sheet according to the exemplary embodiment can be controlled as appropriate. The high-frequency dielectric heating adhesive sheet according to the exemplary embodiment is thus also usable in a roll-to-roll system and can be machined to have a desired area and shape by punching or the like in accordance with an area of bonding to the adherend and a shape of the adherend. Accordingly, the high-frequency dielectric heating adhesive sheet according to the exemplary embodiment is significantly advantageous also in terms of manufacturing process.

Modifications of Exemplary Embodiment

The invention is not limited to the above exemplary embodiment. The invention can include modifications, improvements, and the like as long as they are compatible with the object of the invention.

The high-frequency dielectric heating adhesive sheet may have a sticky portion. The sticky portion inhibits an offset in position when the high-frequency dielectric heating adhesive sheet is held between adherends, allowing the high-frequency dielectric heating adhesive sheet to be placed at an accurate position. The sticky portion may be provided in one surface or both surfaces of the high-frequency dielectric heating adhesive sheet. Further, the sticky portion may be provided at part(s) of the surface(s) of the high-frequency dielectric heating adhesive sheet. The high-frequency dielectric heating adhesive sheet without the sticky portion can also firmly bond the first adherend and the second adherend.

The high-frequency dielectric heating treatment may be performed by a lattice-electrode high-frequency dielectric heating device without being limited to the dielectric heating adhesion device including the opposed electrodes described in the above exemplary embodiment. The lattice-electrode high-frequency dielectric heating device includes a lattice electrode in which electrodes having a first polarity and electrodes having a second polarity are alternatively arranged at regular intervals in the same surface, the first polarity being opposite to the second polarity.

For example, when a joined body is produced by bonding the first adherend and the second adherend with ends of the first and second adherends overlapping with each other, a high-frequency electric field is applied by the lattice-electrode high-frequency dielectric heating device placed on a side close to the first adherend or a side close to the second adherend.

In bonding the first adherend and the second adherend using the lattice-electrode high-frequency dielectric heating device, a high-frequency electric field may be applied at the same time by a first lattice-electrode disposed at the side close to the first adherend and a second lattice-electrode disposed at the side close to the second adherend with the first adherend, the high-frequency dielectric heating adhesive sheet, and the second adherend being interposed between the first lattice-electrode and the second lattice-electrode.

In bonding the first adherend and the second adherend using the lattice-electrode high-frequency dielectric heating device, a high-frequency electric field may be applied with the lattice electrode disposed on one surface side of the first adherend and the second adherend, and then a high-frequency electric field may be applied with the lattice electrode disposed on the other surface side of the first adherend and the second adherend.

Also preferably, the lattice-electrode high-frequency dielectric heating device is used to apply a high-frequency electric field. The use of the lattice-electrode high-frequency dielectric heating device allows adherends to bond to each other without being affected by the thickness of the first adherend and the second adherend through dielectric heating from a front-layer side of the first adherend and the second adherend (e.g. from an adherend side less distant to the high-frequency dielectric heating adhesive sheet). Further, the use of the lattice-electrode high-frequency dielectric heating device reduces energy required for producing the joined body.

It should be noted that an example using the dielectric heating adhesion device provided with opposed electrodes is exemplary shown in the diagram for the purpose of simplification.

EXAMPLES

The invention will be described below in further detail with reference to Examples. The invention is by no means limited to these Examples.

Preparation of High-Frequency Dielectric Heating Adhesive Sheet (Examples 1 to 3 and Comparatives 1 to 3)

The thermoplastic resin (A) and the dielectric filler (B) shown in Table 1 were premixed. The premixed material was supplied into a hopper of a 30-mm-diameter twin-screw extruder. Then, the premixed material was melted and kneaded at a cylinder setting temperature of 160 degrees C. and a die temperature of 160 degrees C. The material subjected to the melt kneading was cooled, followed by cut into granular pellets. Subsequently, the resultant granular pellets were loaded into a hopper of a single screw extruder provided with a T-die. Then, a film-shaped melted and kneaded substance was extruded from the T-die while the silane coupling agent (C) was added through a liquid adding device provided for the extruder. Temperature conditions at the time of extruding were a cylinder temperature of 160 degrees C. and a die temperature of 160 degrees C. The film-shaped melted and kneaded substance extruded from the T-die was cooled by a cooling roll to produce a 400-μm thick high-frequency dielectric heating adhesive sheet for each of Examples 1 to 3 and Comparatives 1 to 3.

Details of the thermoplastic resin (A), the dielectric filler (B), and the silane coupling agent (C) shown in Table 1 are as follows.

Thermoplastic Resin (A)

m-PP: polypropylene having a maleic anhydride structure (the content of a monomer having maleic anhydride was 10 mass % or less, MFR=7 g/10 min)

PP: polypropylene having no reactive site

Dielectric Filler (B)

ZnO: zinc oxide (product name "LP-ZINC11" produced by SAKAI CHEMICAL INDUSTRY CO., LTD.)

Silane Coupling Agent (C)

SC1: 8-glycidoxyoctyl trimethoxysilane

SC2: 3-glycidoxypropyl trimethoxysilane

5%-Weight-Reduction Temperature

The 5%-weight-reduction temperature Td5 was measured using a differential thermal analyzer (TG/DTA analyzer "DTG-60" produced by Shimadzu Corporation).

Under air atmosphere, the temperature of each measurement sample was increased from 40 degrees C. to 300 degrees C. at a gas flow rate of 100 ml/min and a temperature increase rate of 10 degrees C./min, where the 5%-weight-reduction temperature of each measurement sample was measured.

Table 2 shows the 5%-weight-reduction temperature Td5 of the silane coupling agent (C).

MFR: Melt Flow Rate

The MFR of the thermoplastic resin was measured by a Flow Tester drop flow tester (model No. "CFT-100D" produced by Shimadzu Corporation) in accordance with JIS K 7210-1:2014.

Flow Start Temperature

The flow start temperature of the thermoplastic resin was measured by a Flow Tester drop flow tester (model No. "CFT-100D" produced by Shimadzu Corporation). A stroke displacement rate (mm/min) that depended on rising temperature was measured at a load of 5.0 kg and a sample-temperature-increase rate of 10 degrees C./min using a die (hole diameter: 2.0 mm, hole length: 5.0 mm) and a cylinder (inner diameter. 11.329 mm) to obtain a temperature-dependent chart of the stroke displacement rate of the measurement sample. In this chart, a temperature, at which the stroke displacement rate increased again after passing through a peak on a low-temperature side, was determined as the flow start temperature.

The flow start temperature of m-PP was 153 degrees C.

Volume Average Particle Diameter of Dielectric Filler

The particle size distribution of the dielectric filler was measured by a laser diffraction/scattering method. The volume average particle diameter was calculated from a result of the measurement of particle size distribution in accordance with JIS Z 8819-2: 2001. The volume average particle diameter of zinc oxide (ZnO) calculated was 11 μm.

Evaluation of High-Frequency Dielectric Heating Adhesive Sheet

Each high-frequency dielectric heating adhesive sheet was evaluated as follows. Table 1 shows evaluation results.

Adhesion Performance

The high-frequency dielectric heating adhesive sheet, which was cut into a size of 25 mm×12.5 mm, was arranged between soda-lime glass (25 mm×100 mm×3 mm (thickness)) as a pair of adherends. After the arrangement, the adherends and the high-frequency dielectric heating adhesive sheet were fixed between electrodes of a high-frequency dielectric heating device (product name "YRP-400T-A" produced by Yamamoto Vinita Co., Ltd.). The electrodes of the high-frequency dielectric heating device each had an area of 800 $mm^2$ (=40 mm×20 mm), and the electrodes were arranged to cover the overlapping portion of the adherends (soda-lime glass). A high-frequency electric field was applied in a state where the adherends and the high-frequency dielectric heating adhesive sheet were fixed between the electrodes under high-frequency wave application conditions below, bonding the high-frequency dielectric heating adhesive sheet and the adherends. Accordingly, each test piece for adhesive performance evaluation was prepared. Pressing pressure at the time of application of the high-frequency electric field was a pressure applied to a joint of the pair of adherends.

Application Conditions for High-Frequency Electric Field

Frequency: 40.68 MHz

Output: 200 W

Application Time: 90 seconds

Pressing Pressure: 0.5 MPa

The test piece for adhesion performance evaluation was subjected to measurement of a tensile shear strength (unit: MPa). The tensile shear strength was measured using a universal tensile tester (product name "INSTRON 5581" produced by Instron Corporation). The tensile shear strength was measured at a tension rate of 10 mm/min. Note that "No Bonding" for the tensile shear strength in Table 1 means that the adherend(s) was separated easily from the adhesive sheet before the measurement of the tensile shear strength.

Furthermore, a breaking mode of the test piece for adhesion performance evaluation was observed during the measurement of the tensile shear strength to evaluate the adhesion performance in accordance with the criteria below. The tensile shear strength was measured in accordance with JIS K 6850: 1999.

A: Adherend was broken.

B: High-frequency dielectric heating adhesive sheet had cohesive failure.

F: High-frequency dielectric heating adhesive sheet and adherend were separated at the interface.

Volatilization of Material

In the preparation of the high-frequency dielectric heating adhesive sheet, the presence or absence of smoking at the time of kneading of respective materials was visually confirmed, and evaluated for the volatilization of material in accordance with the criteria below.

A: No white smoke was generated.

F: White smoke was generated.

Bleedout

In the preparation of the test piece for adhesion performance evaluation, a surface of the adherend in the vicinity of the melted high-frequency dielectric heating adhesive sheet was visually confirmed, and evaluated for the bleedout in accordance with the criteria below.

A: No liquid or solid residues were generated on the surface of the adherend.

F: Liquid or solid residues were generated on the surface of the adherend.

TABLE 1

| | Composition of High-Frequency Dielectric Heating Adhesive Sheet | | | | | | Evaluation | | | |
|---|---|---|---|---|---|---|---|---|---|---|
| | | | | | | | Adhesion Performance | | | |
| | | | | | | | | Tensile Shear | | |
| | Thermoplastic Resin (A) | | Dielectric Filler (B) | | Silane Coupling Agent (C) | | Breaking Mode Adherend: | Strength [MPa] Adherend: | In Kneading Volatilization | In Bonding |
| | Type | [vol %] | Type | [vol %] | Type | [vol %] | Glass | Glass | of Material | Bleedout |
| Ex. 1 | m-PP | 72 | ZnO | 20 | SC1 | 8 | A | 3.3 | A | A |
| Ex. 2 | m-PP | 72 | ZnO | 20 | SC2 | 8 | A | 3.2 | F | A |
| Ex. 3 | m-PP | 66 | ZnO | 20 | SC1 | 14 | A | 3.5 | A | F |
| Comp. 1 | PP | 72 | ZnO | 20 | SC1 | 8 | F | No Bonding | A | A |
| Comp. 2 | m-PP | 80 | ZnO | 20 | — | — | F | No Bonding | A | A |
| Comp. 3 | PP | 80 | ZnO | 20 | — | — | F | No Bonding | A | A |

TABLE 2

| Silane Coupling Agent (C) | | |
|---|---|---|
| | Type | Td5 [° C.] |
| SC1 | 8-glycidoxyoctyl trimethoxysilane | 193 |
| SC2 | 3-glycidoxypropyl trimethoxysilane | 145 |

The high-frequency dielectric heating adhesive sheet in each of Examples 1 to 3 bonded, even with small consumption energy, adherends made of glass with high bonding strength.

The invention claimed is:

1. A high-frequency dielectric heating adhesive sheet comprising an adhesive layer that comprises:

a thermoplastic resin (A) comprising a reactive site (Y);

a dielectric material that generates heat upon application of a high-frequency electric field; and a silane coupling agent (C), wherein the silane coupling agent (C) comprises a functional group (X) and an alkoxysilyl group (Z), wherein a main chain linking the functional group (X) with a silicon atom of the alkoxysilyl group (Z) comprises eight or more atoms, excluding atoms of side chains bonded to atoms forming the main chain and hydrogen atoms on the main chain.

2. The high-frequency dielectric heating adhesive sheet according to claim 1, wherein a volume content ratio of the silane coupling agent (C) in the adhesive layer is in a range from 0.5 vol % to 25 vol %.

3. The high-frequency dielectric heating adhesive sheet according to claim 1, wherein the functional group (X) is at least one group selected from the group consisting of an epoxy group, an amino group, an isocyanate group, and a mercapto group.

4. The high-frequency dielectric heating adhesive sheet according to claim 1, wherein a molecular weight of the silane coupling agent (C) is 200 or more.

5. The high-frequency dielectric heating adhesive sheet according to claim 1, wherein a difference ΔT between a 5%-weight-reduction temperature Td5 of the silane coupling agent (C) and a flow start temperature Tfs of the thermoplastic resin (A), represented by a numerical formula (Numerical Formula 1), is-20 degrees C. or more, $$\Delta T = Td5 - Tfs \quad \text{(Numerical Formula 1)}.$$

6. The high-frequency dielectric heating adhesive sheet according to claim 1, wherein the silane coupling agent (C) has a 5%-weight-reduction temperature of 120 degrees C. or more.

7. The high-frequency dielectric heating adhesive sheet according to claim 1, wherein the reactive site (Y) comprises at least one selected from the group consisting of a carboxy group, a hydroxyl group, an amino group, an isocyanate group, and an acid anhydride structure.

8. The high-frequency dielectric heating adhesive sheet according to claim 1, wherein the reactive site (Y) comprises a maleic anhydride structure.

9. The high-frequency dielectric heating adhesive sheet according to claim 1, wherein the thermoplastic resin (A) is a polyolefin resin.

10. The high-frequency dielectric heating adhesive sheet according to claim 1, wherein a volume content ratio of the dielectric material in the adhesive layer is in a range from 5 vol % to 50 vol %.

11. The high-frequency dielectric heating adhesive sheet according to claim 1, wherein the dielectric material is a dielectric filler (B).

12. The high-frequency dielectric heating adhesive sheet according to claim 11, wherein the dielectric filler (B) comprises at least one selected from the group consisting of zinc oxide, silicon carbide, barium titanate, and titanium oxide.

13. The high-frequency dielectric heating adhesive sheet according to claim 11, wherein a volume average particle diameter of the dielectric filler (B) is in a range from 1 μm to 30 μm, and the volume average particle diameter is a volume average particle diameter obtained by measuring a particle size distribution of the dielectric filler (B) by a laser diffraction/scattering method and performing calculation from a result of the particle size distribution measurement in accordance with JIS Z 8819-2:2001.

14. A bonding method comprising:

providing the high-frequency dielectric heating adhesive sheet according to claim 1 between a first adherend and a second adherend; and applying a high-frequency electric field to the high-frequency dielectric heating adhesive sheet to bond the first adherend and the second adherend.

15. A joined body comprising a first adherend, a second adherend, and the high-frequency dielectric heating adhesive sheet according to claim 1, wherein at least one of the first adherend or the second adherend is an adherend made of glass, and the first adherend is bonded with the second adherend via the high-frequency dielectric heating adhesive sheet.

* * * * *